March 7, 1961
R. H. WELLS
2,973,994
ANTI-SKID CONTROL
Filed Oct. 29, 1958
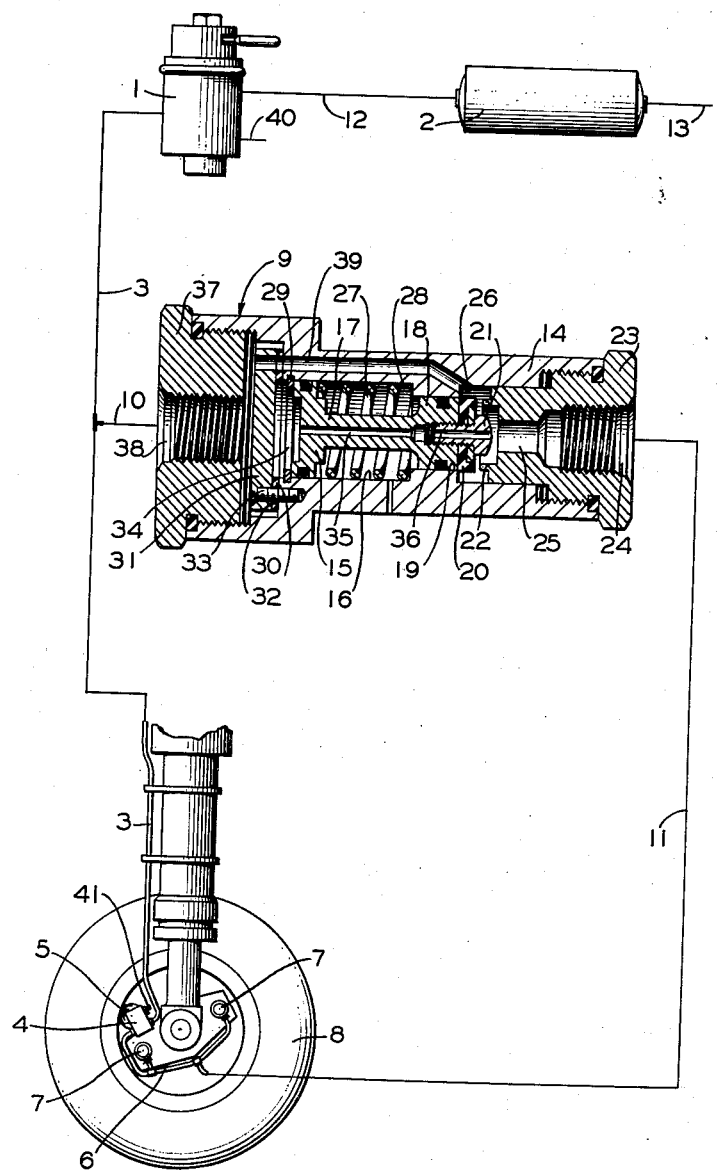
INVENTOR.
Richard H. Wells
BY
Adelbert A. Steinmeier
Attorney

United States Patent Office 2,973,994
Patented Mar. 7, 1961

2,973,994

ANTI-SKID CONTROL

Richard H. Wells, Pittsburgh, Pa., assignor to Westinghouse Air Brake Company, Wilmerding, Pa., a corporation of Pennsylvania Filed Oct. 29, 1958, Ser. No. 770,481

2 Claims. (Cl. 303—24)

This invention relates to fluid pressure brake control apparatus of the type including wheel-slip responsive control means for preventing wheel-skid by automatically controlling operation of the apparatus during a brake application, and, more particularly, to a flow control valve device, hereinafter referred to as a by-pass valve device, for use with such brake control apparatus for insuring adequate supply of fluid under pressure to the brake applying means upon initiation of a brake application.

As used hereinafter, the term "wheel-slip" will refer to that rotative condition of a vehicle wheel in which the rate of angular acceleration of the wheel, at any given instant, is in variance with the rate of linear acceleration of the vehicle, and the term "wheel-skid" will refer to the dragging of a locked wheel along the ground.

Through usage of some of the presently known brake control apparatus of the above-defined type such as used on aircraft, for example, it has been discovered in some instances that, upon initiation of a brake application, the rate of build-up of fluid pressure supplied to the brake cylinder devices is inadequate for producing a brake application of desired effectiveness. In order to understand the reason for this inadequacy, a brief description of the brake control apparatus mentioned would be helpful at this point.

Very briefly, the brake control apparatus above mentioned may be of the type disclosed, for example, in U.S. Patent 2,656,017, issued to H. W. Trevaskis on October 20, 1953, and comprises a controller associated with the vehicle wheel and responsive to the rotating condition thereof for controlling a release valve device interposed in the fluid pressure supply conduit leading to the wheel brake cylinders. After initiation of the brake application, by opening the supply conduit to a source of fluid under pressure through operation of a manually operable brake control valve device, further control of the brakes is automatically taken over by the controller and the release valve device, the controller being sensitive to any variance between the rate of rotation of the vehicle wheel and the linear speed of the vehicle to cause operation of the release valve device to effect a release of the brake application until the rate of rotation of the wheel is compatible with the linear speed of the vehicle, whereupon the controller causes the release valve device to effect a reapplication of the brakes. The apparatus functions through the cycle immediately above described as many times as is necessary to correct any such occurrences of abnormal rotation of the wheel until the vehicle is brought to a stop. The cycle of operation as just described normally requires merely a fraction of a second in duration of time.

In view of the high speeds at which present day aircraft are landed and the operative nature of the apparatus as briefly above described, it should be apparent that precision in structure is of the utmost necessity in order to attain the high degree of responsive sensitivity to effect an immediate correction of any abnormal wheel rotative condition within the time interval permissible to avert any possible damage such as might be caused by a locked wheel while the aircraft is moving on the runway at a high rate of speed. Due to the precise structural nature of the apparatus, the passageways in the release valve device are of a certain flow capacity. This defined flow capacity of the passageways, though adequate and precisely correct for normal operation of the apparatus during abnormal wheel-rotation corrective periods, has been found in some instances to be too restrictive at the initiation of a brake application to permit build-up of fluid pressure in the brake cylinder at a sufficient rate necessary for producing an effective brake application. Any delay in retardation of the aircraft upon touchdown, of course, results in a longer stopping run, which is not desirable when the runway is of minimum length relative to the stopping distance of the aircraft.

Accordingly, the object of the present invention is to provide, for use with an anti-wheel-skid brake control apparatus of the type comprising a controller responsive to wheel-slip and cessation thereof and a release valve device operably controlled by said controller for causing the brakes to be released and reapplied respectively upon occurrence of wheel-slip and cessation thereof, means for insuring build-up of fluid pressure to the brake cylinders, upon initiation of a brake application, at a rate sufficient to produce an application of maximum effectiveness. Essentially, the invention comprises a by-pass valve device interposed in a conduit by-passing the release valve device of an anti-wheel-skid control apparatus for aircraft by having one end connected to the supply side of the release valve device and the other end connected to the delivery side of said release valve device, said by-pass valve device being operable, upon initiation of a brake application, to provide a communication through the by-passing conduit in addition to that provided through the release valve device, whereby a supplementary supply of fluid under pressure, in addition to that flowing through the release valve device, is provided for the brake cylinder through said by-passing communication to insure effective initial brake application. Upon establishment of fluid pressure equalization throughout the brake system, the by-pass valve device operates to close the by-pass communication, after which the amount of fluid under pressure flowing to and from the brake cylinders is directed through the release valve device and determined by the flow capacity thereof.

The single figure drawing is a schematic view showing a brake control apparatus embodying the invention, the by-pass valve being shown of disproportionately large size for clarity.

*Description and operation*

Referring to the drawing, the apparatus, as shown, comprises a manually operable brake control valve device 1 for opening or closing a reservoir 2 charged with fluid under pressure to a supply conduit 3 leading to the inlet side of a release valve device 4 which is operably controlled by a wheel-slip responsive device 5. The outlet side of the release valve device 4 is connected by a conduit 6 to a pair of wheel brake cylinder devices 7 for operating disc-type brakes (not shown) on a wheel 8. A by-pass valve device 9 is connected on its inlet side by a conduit 10 to conduit 3 and on its outlet side by a conduit 11 to conduit 6.

The brake control valve device 1 is connected by a conduit 12 to the reservoir 2, which is charged with fluid under pressure through a conduit 13 by a compressor (not shown), said control valve device being of the well-known manually operable, self-lapping type having a brake release position in which reservoir 2 is cut off from the supply conduit 3, and being operable to a brake application position for opening reservoir 2 to supply conduit 3 and maintaining fluid therein at a pressure determined by a selective position within a brake application range to which the control valve device is operated or set by the operator, depending upon the intensity of brake application desired.

A detailed structural description of the release valve device 4 and the controller 5 is not deemed essential for proper understanding of the invention and, therefore, is omitted herein. Nor is it believed necessary to further elaborate on the functional aspects thereof beyond the description hereinbefore set forth.

The by-pass valve device 9 comprises a substantially cylindrical casing 14 open at both ends and a piston assemblage including a piston 15 coaxially and slidably operable in a bore 16 formed in said casing. The piston 15 is integrally and coaxially connected by a stem 17 with a piston 18 slidably movable in a bore 19 formed in said casing in coaxial alignment with and of smaller diameter than bore 16. An annular valve member 20 is secured by a screw 21 to the face of the piston 18 opposite stem 17. A complementary annular valve seat 22 on which the valve member 20 may seat, in a manner to be hereinafter explained, is carried by a screw-threaded cap nut 23 which is screwed into and closes off one end of casing 14. The cap nut 23 is provided with a screw-threaded outlet 24 for connecting conduit 11 thereto and a passageway 25 extending from said outlet and opening within the periphery of the annular valve seat 22 into a pressure chamber 26 in which said valve seat and the valve member 20 are disposed.

The pistons 15 and 18 and valve member 20 are biased toward a left-hand direction, as viewed in the drawing, by the compression of a spring 27 encircling the stem 17 and having one end bearing against the piston 15 and the other end against a shoulder 28 formed by the junction of the two bores 16 and 19. Movement of the pistons 15 and 18 and valve 20 toward the left-hand direction is limited to a normal position defined by abutment of said piston against a stop ring 29 secured in the bore 16 adjacent the end opposite shoulder 28 and in which normal position said valve member is in an unseated position relative to the valve seat 20. An atmospheric port is provided in the casing wall for venting that portion of the volume defined by the bore 16 between piston 15 and piston 18 to prevent dash-pot effect during movement of the piston assemblage. The end of bore 16 adjacent the stop ring 29 is sealed off by a sealing gasket 30 and a sealing plate 31 secured against a shoulder 32, formed in the casing, by a plurality of screws 33 (only one being shown in the drawing). The piston 15, casing 14 and sealing plate 31 cooperate to form a control chamber 34 open to a passageway 35 extending axially through stem 17 and a pasageway 36 extending axially through screw 21 thereby connecting said control chamber to passageway 25 and to pressure chamber 26, but to the latter only when valve member 20 is in its unseated position.

The end of casing 14 adjacent sealing plate 31 is closed off by a screw-threaded cap nut 37 having a screw-thread inlet 38 to which conduit 10 is connected. Inlet 38 is in direct communication with pressure chamber 26 via a passageway 39 extending through sealing plate 31 (but sealed off by gasket 30 from chamber 34) and casing 14.

The apparatus embodying the invention operates in the following manner. A brake application on the wheel 8 is initiated by operation of the brake control valve device 1 to open communication between conduits 12 and 3, whereby fluid under pressure may flow from reservoir 2 to the brake cylinder devices 7 through the release valve device 4. Fluid under pressure may also flow to the brake cylinder devices 7 by way of conduit 10, passageway 39 in the by-pass valve device 9, pressure chamber 26, past the unseated valve 20, through passageway 25, and through conduits 11 and 6. As the fluid pressure builds up in the system, such pressure also builds up in control chamber 34, which, it will be recalled, is open to pressure chamber 26 by way of passageways 35 and 36, until the force of pressure acting on the side of piston 15 adjacent said control chamber is sufficient for overcoming the combined opposing forces of spring 27 and the pressure of fluid acting on the side piston 18 adjacent pressure chamber 26. The pistons 15 and 18 and valve 20 are thus moved in the direction of the right hand, as viewed in the drawing, to a cut-off position in which valve 20 occupies a seated position on valve seat 22 to cut off further communication between passageway 39 and conduit 11. The compression value of spring 27 is such that the valve 20 remains seated until the pressure of fluid acting on piston 15 in chamber 34 is reduced to some predetermined degree less than the minimum degree of pressure at which fluid is delivered to the brake cylinders 7. Therefore, notwithstanding any number of operations of the controller 5 and the release valve device 4 to release the brakes in response to wheel slipping once valve 20 has been seated, in the manner immediately above described, said valve remains seated until the brake control valve device 1 is operated to a brake release position in which the system is exhausted of fluid under pressure through a vent port 40 in said brake control valve device. Each cycle of operation of the controller 5 and release valve device 4 is of such short duration of time (as above noted) that the release of fluid pressure from the brake cylinders 7 to atmosphere through a vent port 41 in said release valve device, is very nominal and merely results in a momentary release of the brakes sufficient to allow the wheel 8 to recover up to vehicle speed but does not exhaust the system sufficiently to reduce the pressure acting on piston 15 in chamber 34 to the predetermined degree at which spring 27 is effective for unseating valve 20.

Upon completion of the braking operation, the operator operates the brake control valve device 1 to release position to thereby vent fluid pressure from the system to atmosphere via vent port 40, whereupon the pressure in chamber 34 acting on piston 15 is vented by way of passageways 35, 36 and 25, outlet 24 in the by-pass valve device 9, conduits 11 and 6, release valve device 4, conduit 3 and vent port 40 in said brake control valve device. Upon reduction of pressure in chamber 34 to the prescribed predetermined degree, spring 27 becomes effective for restoring pistons 15 and 18 and valve 20 to their normal position in which valve 20 is unseated from seat 22. With valve 20 in its unseated position, the by-passing communication through by-pass valve device 9 and conduits 10 and 11 is again established, whereby an adequate quantity of fluid under pressure is assured for the brake cylinders 7 upon subsequent initiation of a brake application.

Having now described the invention, what I claim as new and desire to secure by Letters Patent is:

1. A fluid pressure charging means for use with fluid pressure operable apparatus including a source of fluid under pressure, a fluid pressure receiving device, a supply conduit whereby fluid under pressure may flow from the source to the receiving device, and control means interposed in the supply conduit between the source and the receiving device for controlling supply and relief of fluid under pressure to and from, respectively, the receiving device, said fluid pressure charging means comprising, in combination, a bypass conduit connected at its opposite ends to the supply conduit on the supply side and the delivery side, respectively, of the control means in by-passing relation thereto, a casing having an inlet and an outlet connected respectively to the supply side and the delivery side of said bypass conduit and having formed therein, adjacent respective opposite ends thereof, a control chamber and a pressure chamber, a piston assemblage operably disposed within said casing between said control chamber and said pressure chamber and comprising two pistons, one having a larger pressure area than the other, the pressure area of said other piston being subjected to pressure of fluid in said pressure chamber which is open to said inlet through a first passageway formed in said casing between said inlet and said outlet, a stem integrally and coaxially connecting said two pistons and having a coaxial passageway extending therethrough and opening at its opposite ends to the respective pressure areas of said two pistons, a valve carried by said other piston, a valve seat disposed in said pressure chamber encircling said first passageway and on which said valve is adapted to seat, said piston assemblage having a normal position in which said valve is unseated from said valve seat for establishing communication between said inlet and said outlet, and thereby through said bypass conduit, and between said control chamber and said pressure chamber through said coaxial passageway, and being operable, in response to a differential force established by fluid pressure acting on said two pistons, to a cut-off position in which said valve is seated on said valve seat for disestablishing said communications between said inlet and said outlet and between said control chamber and said pressure chamber, and spring means effective for restoring said piston assemblage to its normal position upon reduction of fluid pressure in said control chamber to a value at which said differential force acting on the piston assemblage becomes less than the force exerted by the spring.

2. In a vehicle brake control apparatus, the combination comprising a source of fluid under pressure, a brake cylinder device responsive to fluid pressure for effecting a brake application on a vehicle wheel and to relief of such pressure for releasing the brake application, a supply conduit whereby fluid under pressure may flow from the source to said brake cylinder device, control means interposed in said supply conduit between said source and said brake cylinder device for controlling supply and relief of fluid under pressure to and from respectively, said brake cylinder device, a bypass conduit connected at its opposite ends to the supply conduit on the supply side and the delivery side, respectively, of the control means in by-passing relation thereto, a casing having an inlet and an outlet connected respectively to the supply side and the delivery side of said bypass conduit and having formed therein, adjacent respective opposite ends thereof, a control chamber and a pressure chamber, a piston assemblage operably disposed within said casing between said control chamber and said pressure chamber and comprising two pistons, one having a larger pressure area than the other, the pressure area of said other piston being subjected to pressure of fluid in said pressure chamber which is open to said inlet through a first passageway in said casing having one end open to said inlet and the other end open to said outlet, a stem integrally and coaxially connecting said two pistons, said stem having a coaxial passageway extending therethrough with its opposite ends opening to the respective pressure areas of said two pistons and through which said control chamber is constantly open, via said outlet end of said first passageway, to said delivery side of said bypass conduit, a valve carried by said other piston, a valve seat disposed in said pressure chamber encircling said first passageway and on which said valve is adapted to seat, said piston assemblage having a normal position in which said valve is unseated from said valve seat for establishing communication between said inlet and said outlet, and thereby through said bypass conduit, and between said control chamber and said pressure chamber through said coaxial passageway, and being operable, in response to a differential force established by fluid pressure acting on said two pistons, to a cut-off position in which said valve is seated on said valve seat for disestablishing said communication between said inlet and said outlet and between said control chamber and said pressure chamber, and spring means effective for restoring said piston assemblage to its normal position upon reduction of fluid pressure in said control chamber, via said delivery side of said bypass conduit and the supply conduit upon operation of said control means to relieve fluid pressure from said brake cylinder device, to a value at which said differential force acting on the piston assemblage becomes less than the force exerted by said spring.

References Cited in the file of this patent
UNITED STATES PATENTS

| | | |
|---|---|---|
| 2,656,017 | Trevaskis | Oct. 20, 1953 |
| 2,941,845 | Osborne | June 21, 1960 |

FOREIGN PATENTS

| | | |
|---|---|---|
| 780,025 | Great Britain | July 31, 1957 |